United States Patent [19]

Saito et al.

[11] 4,259,397

[45] Mar. 31, 1981

[54] BRAKE LINING MATERIAL

[75] Inventors: Kazuhisa Saito, Mishima; Fumio Miyatake, Shizuoka; Kunio Shibata, Tokyo, all of Japan

[73] Assignees: Toho Beslon Co., Ltd.; Nisshin Spinning Co., Ltd., both of Tokyo, Japan

[21] Appl. No.: 55,668

[22] Filed: Jul. 9, 1979

[30] Foreign Application Priority Data

Jul. 7, 1978 [JP] Japan ................................. 53-82704
Jul. 7, 1978 [JP] Japan ................................. 53-82705

[51] Int. Cl.³ .............................................. D04H 1/58
[52] U.S. Cl. ............................. 428/288; 188/251 A; 423/447.6; 423/447.7; 428/340; 428/367; 428/408; 428/902
[58] Field of Search .............. 428/288, 299, 297, 367, 428/392, 408, 500, 506, 245, 280, 290, 394, 361; 423/447.6, 447.7; 188/251 A, 251 R

[56] References Cited

U.S. PATENT DOCUMENTS

| 3,301,742 | 1/1967 | Noland et al. | 428/367 |
| 3,723,607 | 3/1973 | Halnin | 423/447.7 |
| 3,778,334 | 12/1973 | Sturgeon | 428/367 |
| 3,925,587 | 12/1975 | Park | 423/447.6 |
| 3,949,115 | 4/1976 | Tamura et al. | 428/367 |
| 4,004,053 | 1/1977 | Gump et al. | 428/394 |
| 4,064,207 | 12/1977 | DeCrescente et al. | 428/408 |
| 4,069,297 | 1/1978 | Saito et al. | 423/447.6 |
| 4,080,413 | 3/1978 | Layden et al. | 423/447.7 |
| 4,112,059 | 9/1978 | DiEdwardo | 423/447.6 |

FOREIGN PATENT DOCUMENTS

| 1282484 | 7/1972 | United Kingdom | 428/902 |
| 1333558 | 10/1973 | United Kingdom | 428/902 |

*Primary Examiner*—James J. Bell
*Attorney, Agent, or Firm*—Sughrue, Rothwell, Mion, Zinn and Macpeak

[57] ABSTRACT

A brake pad or lining comprising a binder and a peroxidized fiber derived from an acrylic fiber said peroxidized fiber containing at least about 5 wt % bonded oxygen. The material has a relatively high coefficient of friction as well as good wear resistance and fade resistance and can be used in place of a conventional asbestos brake pad or lining.

9 Claims, No Drawings

BRAKE LINING MATERIAL

BACKGROUND OF THE INVENTION

1. Field of the Invention

This invention relates to a brake lining material having excellent braking characteristics which comprises a binder and preoxidized fibers derived from acrylic fibers as the basic fiber constituent or a mixture thereof with carbon fibers.

2. Description of the Prior Art

Most automotive braking lining materials of conventional type use asbestos as their base. However, there is a strong need for an alternative to asbestos because its dust has been identified as one of the factors that can cause lung cancer.

Requirements for a good brake lining material are a reasonably high coefficient of friction, wear resistance and fade resistance.

SUMMARY OF THE INVENTION

As a result of various studies on the characteristics of preoxidized fibers derived from an acrylic fiber and carbon fibers, it has been found that a brake lining material comprising preoxidized fibers or a mixture thereof with carbon fibers can replace asbestos and that the resultant lining material has a relatively high coefficient of friction as well as good wear and fade resistance. Carbon fibers alone do not give such a high coefficient of friction.

DETAILED DESCRIPTION OF THE INVENTION

In addition to the above described fibrous base material, the brake lining material of this invention contains a binder resin composed of a phenolic resin, an epoxy resin, a polyimide resin, a rubber, etc., wherein a phenolic resin is the most recommendable in practical use. The brake lining may also contain an additive such as a metal powder or inorganic material in powder form to improve the braking characteristics as applied to conventional asbestos brake lining materials. If desired, the lining material can further contain organic fibers such as glass fibers or steel wool, or phenolformaldehyde resin fibers to modify braking characteristics.

The preoxidized fiber derived from an acrylic fiber in this invention is produced by preoxidizing an acrylic fiber comprising at least about 85 wt% of acrylonitrile at a temperature of about 200° to 400° C. in an oxidizing atmosphere such as air. U.S. Pat. No. 4,069,297 discloses a typical process for the preoxidation of an acrylic fiber.

The preoxidized fiber used in this invention contains at least about 5 wt% of bonded oxygen. Lower oxygen contents provide a fiber which is not sufficiently heat resistant to serve as an effective brake lining material. The upper limit of bonded oxygen content is about 15 wt%, beyond which the fiber becomes too brittle to be useful as a material for brake lining.

The carbon fiber used in the present invention in combination with the peroxidized fiber may be produced by carbonizing the preoxidized fiber at a temperature higher than about 600° C. in a non-oxidizing atmosphere such as nitrogen and argon until it is converted to carbon or further to graphite.

Table 1 sets forth the data obtained in an experiment comparing the effect of temperature on the coefficient of friction and wear of the brake lining material of this invention with a conventional asbestos-based lining material. The peroxidized fiber used in the experiment contained 9.5 wt% bonded oxygen and was prepared by oxidizing an acrylic fiber (a copolymer of 97% acrylonitrile and 3% methylacrylate) at 260° C. for 2 hours in air in the same manner as described in U.S. Pat. No. 4,069,297.

TABLE 1

| Sample No. | Composition (wt %) Asbestos | Composition (wt %) Preoxidized Fiber | Coefficient of Friction 200° C. | Coefficient of Friction 250° C. | Coefficient of Friction 300° C. | Wear (cm/kg . m) × $10^{-7}$ 200° C. | Wear (cm/kg . m) × $10^{-7}$ 250° C. | Wear (cm/kg . m) × $10^{-7}$ 300° C. |
|---|---|---|---|---|---|---|---|---|
| 1 | 50 | 0 | 0.21 | 0.24 | 0.26 | 2.4 | 3.7 | 4.7 |
| 2 | 0 | 50 | 0.40 | 0.41 | 0.39 | 1.5 | 1.8 | 2.4 |

Note:
Both samples contained 20 wt % of phenol-formaldehyde resin and 30 wt % of calcium carbonate and were molded by dry process.

As is clear from Table 1, the brake lining material (No. 2) of this invention has a higher coefficient of friction than the asbestos-based lining material (No. 1). In addition, lining material No. 2 shows less wear than lining No. 1 at high temperatures.

A mixture of the preoxidized fiber and carbon fiber may also be used as the base of the brake lining material of this invention. A preferable ratio of the two fibers is about 50 to 98 wt% preoxidized fiber and about 2 to 50 wt% carbon fiber based on the combined amounts of these two fibers. The function of the carbon fiber is to improve wear resistance and heat resistance. Such function is not fully achieved if the carbon fiber content is less than about 2 wt%. While, using more than about 50 wt% of carbon fiber is not accompanied by a corresponding increase in the effect of the fiber. In addition, higher carbon fiber content results in high cost (carbon fiber is much more expensive than the preoxidized fiber) and a lower coefficient of friction.

Table 2 indicates data typically obtained in an experiment comparing the brake lining material of this invention with the asbestos-based lining material in respect of the coefficient of friction and wear at 250° C. The preoxidized fiber used in the experiment was prepared by oxidizing an acrylic fiber (97% acrylonitrile and 3% methylacrylate) at 265° C. for 2 hours in air. The carbon fiber was produced by carbonizing the preoxidized fiber at 1250° C. for 5 minutes under a nitrogen atmosphere.

TABLE 2

| Sample No. | Composition (wt %) Asbestos | Composition (wt %) Preoxidized Fiber | Composition (wt %) Carbon Fiber | Constant-Speed Test 250° C. Coefficient of Friction | Constant-Speed Test 250° C. Wear |
|---|---|---|---|---|---|
| 1 | 50 | 0 | 0 | 0.24 | $3.7 \times 10^{-7}$ cm$^3$/kg . m |
| 2 | 0 | 49 | 1 | 0.41 | $1.8 \times 10^{-7}$ |

TABLE 2-continued

| Sample No. | Composition (wt %) | | | Constant-Speed Test 250° C. | |
|---|---|---|---|---|---|
| | Asbestos | Preoxidized Fiber | Carbon Fiber | Coefficient of Friction | Wear |
| 3 | 0 | 45 | 5 | 0.39 | $1.5 \times 10^{-7}$ |
| 4 | 0 | 40 | 10 | 0.37 | $1.2 \times 10^{-7}$ |
| 5 | 0 | 30 | 20 | 0.36 | $0.8 \times 10^{-7}$ |
| 6 | 0 | 20 | 30 | 0.29 | $0.9 \times 10^{-7}$ |

Note:
Each sample contained 20 wt % of phenol-formaldehyde resin and 30 wt % of calcium carbonate.

The frictional test was carried out in accordance with JIS-4111. The coefficient of friction is expressed as a kinetic value.

As is clear from Table 2, the four samples of the brake lining material of this invention (Nos. 2 to 5) were more effective than the asbestos-based lining material (No. 1) in that they had high coefficient of friction plus significantly high wear resistance at high temperature. As is evident from No. 6, too much carbon fiber results in low coefficient of friction.

The carbon fiber used in this invention is not limited to a carbon fiber derived from an acrylic fiber but a carbon fiber derived from rayon or pitch can also be used. The preoxidized fiber and carbon fiber that constitute the brake pad or lining material of this invention can be shaped by dry-blending less than 10 mm long fibers with a resin or a suitable additive, or alternatively by impregnating the fiber in a woven form or felt with a resin before it is shaped.

This invention will hereunder be described in greater detail by reference to the following Examples which are given here for illustrative purposes only and are by no means meant to limit the scope of this invention. In the Examples, all parts and percents are given by weight.

EXAMPLE 1

A tow of acrylic fiber filaments consisting of 98% acrylonitrile and 2% acrylamide (denier of monofilament: 1.5 denier, the number of filaments: 260,000) was preoxidized at 270° C. in air for one hour and a half in the same manner of U.S. Pat. No. 4,069,297 wherein the shrinkage of the tow was 18% during the preoxidation process. The resultant preoxidized fiber contained 11 wt.% bonded oxygen. Its fiber strength was 3.6 g/d and its breaking elongation was 9%. The preoxidized fiber was cut to a length of 3 mm and mixed with phenol formaldehyde resin and calcium carbonate as a filler in a Henschel mixer in the proportions indicated below.

| Mixing Proportion | |
|---|---|
| Preoxidized fiber | 55 Parts |
| Phenol-formaldehyde resin | 20 Parts |
| Calcium carbonate | 25 Parts |

Thereafter, the mixture was molded at a temperature of 170° C. under a pressure of 160 Kg/cm² to produce a pad material for an automotive disc brake.

The pad material was subjected to a constant speed frictional test in accordance with JIS-D4411. The coefficient of kinetic friction and wear at 250° C. were 0.39 and $1.9 \times 10^{-7}$ cm³/kg.m, respectively. Evaluation of the braking characteristics of the pad material using a brake dynamometer indicated fade resistance comparable to that of a conventional asbestos-based pad as well as lower wear than the latter.

EXAMPLE 2

A strand of acrylic fiber consisting of 97% acrylonitrile and 3% methylacrylate constituents (having a monofilament denier 2.0 and 24,000 filaments) was preoxidized continuously at 260° C. for 30 minutes and then 275° C. for 30 minutes in air. The shrinkage of the strand was 15 percent during the preoxidation process. The resultant preoxidized fiber contained 9.5% of bonded oxygen. The fiber strength was 3.8 g/d. The preoxidized fiber thus produced and "Besfight" (the trade name of carbon fiber manufactured by Toho Beslon Co., Ltd.: the product used had 24,000 filaments having fiber strength of 310 Kg/mm² and fiber modulus of 24.1 Ton/mm²) were cut to a length of 2 mm, and mixed with a phenol-formaldehyde resin and calcium carbonate in a Henschel mixer in the proportions indicated below.

| Mixing Proportion | |
|---|---|
| Preoxidized fiber | 44 Parts |
| Carbon fiber | 6 Parts |
| Phenol-formaldehyde resin | 20 Parts |
| Calcium carbonate | 30 Parts |

The mixture thus prepared was molded at a temperature of 170° C. under a pressure of 150 Kg/cm² to produce a pad material for an automotive disc brake.

The pad material was subjected to a constant speed frictional test in accordance with JIS-D4411. The results were a coefficient of kinetic friction and wear at 250° C. of 0.37 and $1.75 \times 10^{-7}$ cm/kg.m, respectively. Evaluation of the braking characteristics of the pad material using a brake dynamometer indicated fade resistance higher and wear lower than the conventional asbestos-based pad material.

While the invention has been described in detail and with reference to specific embodiments thereof, it will be apparent to one skilled in the art that various changes and modifications can be made therein without departing from the spirit and scope thereof.

What is claimed is:

1. A brake lining comprising a binder and a fiber constituent comprising a preoxidized fiber derived from acrylic fibers and containing at least about 5 wt% of bonded oxygen in combination with carbon fiber, said brake lining exhibiting an excellent coefficient of friction and wear at high temperature.

2. The brake lining of claim 1, wherein the bonded oxygen content of said preoxidized fiber is in the range of from about 5 to 15 wt%.

3. The brake lining of claim 1, wherein about 50 to 98 wt% of said preoxidized fiber and about 2 to 20 wt% of carbon fiber are present as the fiber constituent.

4. The brake lining of claims 1, 2, or 3, wherein a phenol formaldehyde resin is used as a binder.

5. The brake lining of claims 1, 2, or 3 additionally comprising glass fibers.

6. The brake lining of claims 1, 2, or 3 additionally comprising steel wool.

7. The brake lining of claims 1, 2, or 3 additionally comprising phenol-formaldehyde resin fibers.

8. The brake lining of claim 3, wherein about 5 to 50 wt% of said carbon fiber is present.

9. The brake lining of claim 3, wherein about 10 to 50 wt% of said carbon fiber is present.

* * * * *